(12) United States Patent
Lorenz et al.

(10) Patent No.: US 7,958,755 B2
(45) Date of Patent: Jun. 14, 2011

(54) LINEN TREATMENT DEVICE WITH IMBALANCE MONITORING, LEVEL MONITORING, OR LOAD MONITORING

(75) Inventors: Tilmann Lorenz, Bretten (DE); Willibald Reitmeier, Hohenschambach (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 12/878,079

(22) Filed: Sep. 9, 2010

(65) Prior Publication Data

US 2010/0326140 A1    Dec. 30, 2010

Related U.S. Application Data

(60) Division of application No. 12/384,363, filed on Apr. 3, 2009, which is a division of application No. 10/774,978, filed on Feb. 9, 2004, now Pat. No. 7,536,881, which is a continuation of application No. PCT/EP02/08840, filed on Aug. 7, 2002.

(30) Foreign Application Priority Data

Aug. 10, 2001 (DE) .................... 101 39 388

(51) Int. Cl.
*D06F 33/00* (2006.01)
*D06F 39/00* (2006.01)

(52) U.S. Cl. .................. 68/12.06; 68/12.27; 68/23.1

(58) Field of Classification Search ............ 68/12.04, 68/12.06, 12.27, 23.1
See application file for complete search history.

(56) References Cited

U.S. PATENT DOCUMENTS

| | | | | |
|---|---|---|---|---|
| 3,227,835 A * | 1/1966 | Conrath | ............... | 200/61.45 R |
| 4,098,098 A * | 7/1978 | Altnau | ............... | 68/23 R |
| 4,875,533 A | 10/1989 | Mihara et al. | | |
| 5,183,056 A * | 2/1993 | Dalen et al. | ............... | 600/595 |
| 5,565,655 A | 10/1996 | Jeon | | |
| 5,685,038 A * | 11/1997 | Smith et al. | ............... | 8/159 |
| 5,743,115 A * | 4/1998 | Hashimoto | ............... | 68/12.12 |
| 6,065,170 A * | 5/2000 | Jang | ............... | 8/158 |
| 6,151,930 A * | 11/2000 | Carlson | ............... | 68/12.06 |
| 6,292,966 B1 * | 9/2001 | Lim et al. | ............... | 8/158 |
| 6,539,570 B2 * | 4/2003 | Youn et al. | ............... | 8/159 |

(Continued)

FOREIGN PATENT DOCUMENTS

DE        4020898 A1    1/1992

(Continued)

OTHER PUBLICATIONS

M. Bugnacki et al.; "A Micromachined Thermal Accelerometer for Motion, Inclination, and Vibration Measurement", Sensors, Jun. 2001, pp. 98-104, vol. 18, No. 6, Helmers Publishing, US.*

*Primary Examiner* — Joseph L Perrin
(74) *Attorney, Agent, or Firm* — James E. Howard; Andre Pallapies

(57) ABSTRACT

An acceleration sensor for a household device which serves for levelling the appliance and also for weighing the material introduced into the appliance, for example on a laundry unit or crockery and furthermore, in particular for a linen treatment device, for monitoring imbalances. The sensor is based on the principle that a temperature profile, generated by a thermal source, for example, an immersion heater, in a sealed chamber which contains a gas, undergoes a displacement as a result of the acceleration, which is measured by temperature sensors arranged on a flat plate.

8 Claims, 4 Drawing Sheets

U.S. PATENT DOCUMENTS

| | | | | |
|---|---|---|---|---|
| 6,640,637 B2 * | 11/2003 | Baek | | 73/652 |
| 6,675,818 B1 | 1/2004 | Schrott et al. | | |
| 6,832,519 B2 * | 12/2004 | Baek | | 73/514.31 |
| 2001/0025392 A1 * | 10/2001 | Youn et al. | | 8/159 |

FOREIGN PATENT DOCUMENTS

| | | | |
|---|---|---|---|
| DE | 4219298 A1 * | 12/1993 | |
| DE | 4243978 C1 | 1/1994 | |
| DE | 20016793 U1 | 1/2001 | |
| EP | 0294014 A1 | 12/1988 | |
| EP | 0539617 A1 | 10/1991 | |
| EP | 0984092 A1 | 3/1999 | |
| EP | 1087052 A2 | 7/2000 | |

* cited by examiner

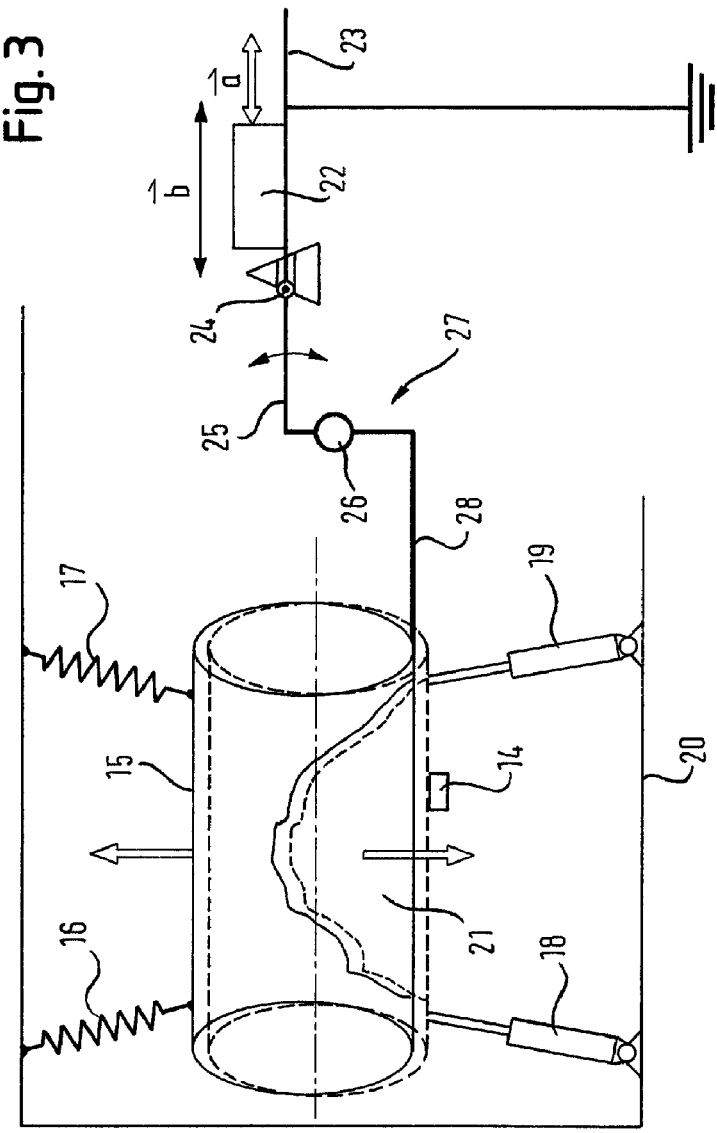
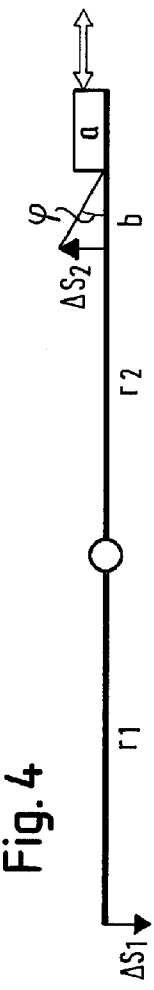

LINEN TREATMENT DEVICE WITH IMBALANCE MONITORING, LEVEL MONITORING, OR LOAD MONITORING

CROSS REFERENCE TO RELATED APPLICATIONS

This application is a Divisional, under 35 U.S.C. §121, of U.S. application Ser. No. 12/384,363, filed Apr. 3, 2009, now allowed, which is a divisional, under 35 U.S.C. §121, of U.S. application Ser. No. 10/774,978, filed Feb. 9, 2004, now U.S. Pat. No. 7,536,881, which is a continuation, under 35 U.S.C. §120, of International Application No. PCT/EP02/08840, filed Aug. 7, 2002, which designated the United States; this application also claims the priority, under 35 U.S.C. §119, of German Patent Application No. 10139388.1, filed Aug. 10, 2001.

BACKGROUND OF THE INVENTION

The invention relates to a linen treatment device with an arrangement for determining the imbalance.

An arrangement for monitoring imbalance in a washing machine is already known from EP 0 539 617 A1. An electric motor monitored by a speed-measuring device, for example, by means of a tacho-generator in a control device especially a series motor is provided in a washing machine. An imbalance sensor which records the imbalance is constructed as a microswitch which is connected in series to the speed measuring device, for example, a tacho-generator. When an impermissible imbalance is reached, the imbalance sensor interrupts the connection to the speed measuring device and the control device.

BRIEF SUMMARY OF THE INVENTION

It is the object of the invention to provide a new device for recording imbalances.

This object is solved according to the invention by the fact that the arrangement has at least one sensor to measure the temperature profile of a heating device built into the sensor, wherein the temperature profile can be varied by an acceleration caused by an imbalance.

If the temperature distribution in a medium heated by the heating device of the sensor varies as a result of an acceleration caused by an imbalance, the temperature distribution thereby varied can be measured and the intensity of the acceleration can be deduced. The direction of the acceleration can also be determined if the temperature distribution in measured in two axes.

Advantageous further developments are obtained from the dependent claims and the description.

A washing machine design where the sensor is arranged on the soapy water container is especially suitable. It is thereby possible to achieve a very direct determination of imbalances which are exerted on the soapy water container during spin-drying of a laundry unit in the drum. Alternatively, the sensor can be arranged on a lever connected to the soapy water container, whereby especially tumbling imbalances, i.e., imbalances in the direction of the axis of rotation of the drum, can be efficiently measured. Such tumbling imbalance cannot be measured by means of a tacho-generator. However, it can be determined by means of an arrangement according to the invention and with a corresponding alignment of the sensor element. When the measurement signal is simultaneously fed back into the control loop of the washing machine drive, the effect of the tumbling imbalance can be compensated by speed ramping, i.e., by controlling the motor. The same applies to a washer drier.

In another advantageous development the sensor is arranged in a damper which damps the vibrations of the soapy water container or in a foot of the washing machine.

In another embodiment it is advantageous that the sensor is located below the upper outer surface of the linen treatment device. The measuring function of the sensor is thereby made directly accessible to the user. It is advantageous if the value measured by the sensor is displayed on a display device. The magnitude of the imbalance is thereby made recognisable to the user.

Equally the result of a measurement made by the sensor can also be displayed for the user by a separate display device.

The sensor for determining imbalance can also be used to subsequently determine the mass of the linen placed in the drum in the rest state of the washing machine. In an advantageous embodiment of the washing machine, a warning device can also be activated by means of the sensor which gives a warning signal when the washing machine is overloaded. Thus, the loading, which is conventionally determined, for example, by an inductive distance measurement, can be determined in a new way compared with the prior art. The loading or the weight or the water level in a washing machine or in a dishwasher can thus be displayed.

The sensor can advantageously also be used to determine the levelling of any household appliance, especially a washing machine. In the case of a washing machine, the sensor can fulfil a double function: on the one hand, it is used to determine imbalances or the mass of a laundry unit and on the other hand, it is used for levelling the washing machine. In this case, the sensor is useful not only when setting up the household appliance in order to set up the household appliance for the first time so that it stands horizontally in both directions in the plane but also later to check whether the household appliance is standing horizontally on both directions as before or whether it has sunk in one or both directions. If pre-determined, still permissible deviations are exceeded, a warning signal is generated so that the user suitably re-levels the appliance.

In another advantageous embodiment of the invention the levelling is carried out by the household appliance itself. For this purpose servomotors are provided, preferably in the area of the appliance feet, or a pneumatic or hydraulic pressure system is provided by which means the fluid can be distributed such that the device stands horizontally in both directions.

If the sensor or a plurality of sensors is accommodated via a lever structure in a foot of the appliance or in a damper, the weight of the household appliance or the useful load, i.e., the loading in a washing machine or a washer drier, can be determined. The useful load can be determined indirectly by evaluating the acceleration of the sensor. Acceleration sensors are known, for example, from the company Memsic. The measurement is made as follows: the drum is first loaded, then it sinks as a result of the loading. This results in an acceleration at the sensor element. Moreover, the time is measured as the second quantity. The distance covered as a result of the loading with the washing can thus be determined. From a knowledge of the damping of the household appliance, the force brought about by loading with the linen can then be determined using Hook's law so that the imbalance mass can be determined.

If necessary, the speed of the washing machine can be reduced and the laundry unit can be re-aligned by reversing. Speed ramping can also be implemented to control the motor.

A particular problem with measuring imbalance involves determining the so-called tumbling imbalance, i.e., the imbalance along the axis of the drum and the drive motor. However, this can be determined according to the invention if the sensor element is suitably selected and aligned. If the measurement signal is simultaneously returned in the control loop of the machine, the tumbling imbalance can be compensated. However, the tumbling can only be determined with a biaxial sensor system.

BRIEF DESCRIPTION OF THE DRAWINGS

The invention is explained in detail hereinafter in exemplary embodiments with reference to the drawings. In the figures:

FIG. 3 shows an arrangement for determining the imbalance of a drum and the loading and the level of a washing machine, FIG. 4 is an equivalent circuit diagram for the measuring arrangement from FIG. 3.

DETAILED DESCRIPTION OF EXEMPLARY EMBODIMENTS OF THE PRESENT INVENTION

Figure 1A:
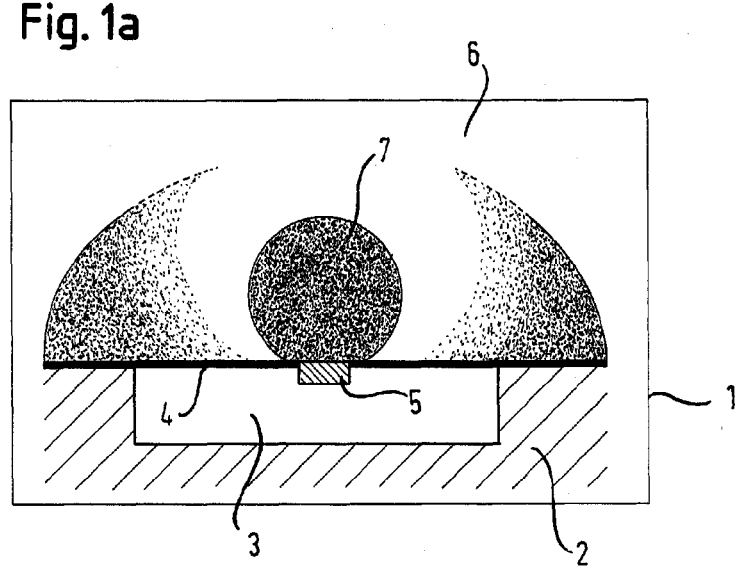
FIG. 1 a,b is a cross-section through a sensor according to the invention.

In a cell enclosed by a wall 1 which serves as pressure encapsulation (FIG. 1a, b), a circular plate 4 which serves as a temperature sensor is arranged on a substrate 2, which preferably consists of silicon, above a circular hole 3. In its central area the plate 4 is penetrated by a rod 5 which heats up, so that a thermal profile builds up above the rod 5 in a space 6 which has a decreasing temperature T with increasing distance from the rod 5. Above the rod 5 forms a substantially spherical or conical area 7 of especially strongly heated gas. Starting from a central point O, the temperature T inside the space 6 is plotted as a function of the distance from the rod 5 in FIG. 1b. The temperature T decreases substantially proportionately with increasing distance from the rod 5.

If a force now acts on the sensor, the gas molecules or gas atoms in the space 6 above the rod 5 are accelerated towards said rod and the plate 4 so that the position of the thermal profile with respect to the original position changes. Since sensors for the temperature measurement are built in the plate 4 preferably in pixel fashion, this positional change can be measured as a change in temperature in one of the two directions X and Y extending through the plane of the plate 4. In this case, not only the positional change of the profile itself can be measured but also its time profile since the sensors inside the plate 4 determine when the profile has changed.

In the same way, a thermal profile 7 not completely symmetrical with respect to the rod 5 builds up if the rod 5 is not arranged completely vertically. This can be used to adjust the levelling of a household appliance. In this case, either a plurality of sensors are present in the fashion shown in FIG. 1a or there is only one sensor in one of the corners of the household appliance on its upper surface, i.e., the working surface.

Figure 2:
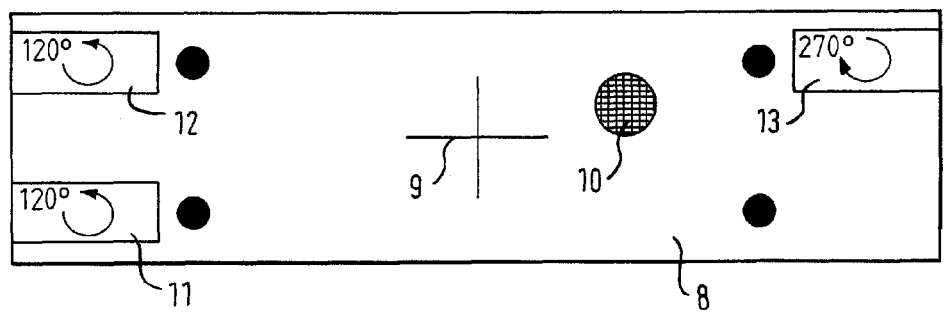
FIG. 2 shows an arrangement equipped with the sensor from FIG. 1a, b for levelling a household appliance.

The deviation of the household appliance from the horizontal is shown in a display 8 (FIG. 2) where a centering cross 9 indicates when the position of the household appliance is completely leveled. In this case, a variable circular display 10 must cover the centre point of the cross 9 with its centre point. As long as this is not yet the case, the feet of the household appliance must be adjusted in height, as shown in FIG. 2, for which the user receives instruction from the information on the display. The feet which need to be adjusted are shown by the displays 11, 12, 13. It is also indicated whether the foot needs to be turned upwards, as is the case with displays 11, 12 according to which the feet need to be turned upwards by respectively 120° or whether the foot needs to be turned downwards, which is the case with display 13, according to which the foot needs to be turned downwards by 270° s In this way any household appliance, especially a linen treatment device such as a washing machine or a washer drier can be leveled. The levelling information can also be evaluated by the appliance control system. During the initial setting up of the household appliance at a location the at least one sensor or the plurality of sensors controls the levelling. If this is not correct, the height adjustment of the adjusting feet is automatically varied by means of servomotors or by means of a hydraulic or pneumatic system. The levelling information is either displayed visually, as by the display 8, or it is passed on audibly to the user by means of a loudspeaker. The household appliance preferably has an interface for connecting the household appliance to the internet or online assistance for the adjustment is given to the user by telephone.

In another exemplary embodiment (FIG. 3) a sensor 14 is arranged below a soapy water container (shown only schematically here). The soapy water container 15 is mounted in a household appliance 20 (not reproduced to scale here) using tension springs 16, 17 and dampers 18, 19. In this case, a laundry unit 21 acts with the force of its weight together with the weight of the soapy water container 15 on the dampers 18, 19.

Instead of the arrangement of the sensor 14 below the soapy water container 21, a sensor 22 can also be provided which is mounted on a rail 23 which is connected via a hinge joint 24 to a lever arm 25 of a lever 27 which is pivotable about a fulcrum 26. The other lever arm 28 of the lever 27 is connected to the soapy water container 15 parallel to the direction of the axis of rotation of the soapy water container 15. A rotational movement of the lever 27 is converted to a translational movement in the direction of a path b via the hinge joint 24. If the soapy water container 15 is accelerated downwards as a result of an imbalance or by the loading with washing having a force F, the force of its weight, this acceleration is converted via the lever 27 into a horizontal acceleration a along the path b.

As a result of the relationship between the path b and the acceleration a:

$$b = \frac{1}{2} a \cdot t^2,$$

where t is the acceleration time and wherein the force of the weight is $$F = M \cdot g,$$

In this case, M is the weight of the total load and g is the acceleration due to gravity. The spring force F exerted by the soapy water container 15 inside the damping system with the tension springs 16, 17 and the dampers 18, 19, is given by:

$$F = D \cdot \Delta s_1$$

where D is the spring constant and $\Delta s_1$ is the distance covered by the soapy water container 15 in the perpendicular direction. The centrifugal force $F_Z$ is given by:

$$F_Z = m \cdot \omega^2 \cdot r,$$

where $\omega$ is the angular velocity and m is the difference from the imbalance minus the weight. Taking into account the lever path:

$$\frac{\Delta s_1}{r_1} = \frac{\Delta s_2}{r_2},$$

where $r_1$ and $r_2$ are the lever paths and $\Delta s_1$ and $\Delta s_2$ are the paths for the movement of the soapy water container 15 or the movement of the lever arm 25 in the perpendicular direction, the mass of the washing is obtained as:

$$M = \frac{D \cdot \tan\varphi \cdot a \cdot t^2 \cdot r_1}{2 \cdot g \cdot r_2},$$

In this case, tan φ (see FIG. 4) is given by:

$$\tan\varphi = \frac{\Delta s_2}{b}$$

From this it follows that the imbalance m of the washing is given by $$m = \left( \frac{\frac{D \cdot \tan\varphi \cdot a \cdot t^2}{2} - M \cdot g}{\omega^2 r} \right)$$

Thus, the sensor 22 is capable of measuring the acceleration values. The acceleration values can then be used to determine both the mass of the washing and any imbalance of the drum during operation. Thus, the sensor 22 is suitable both for static and for dynamic measurements.

Figure 1B:
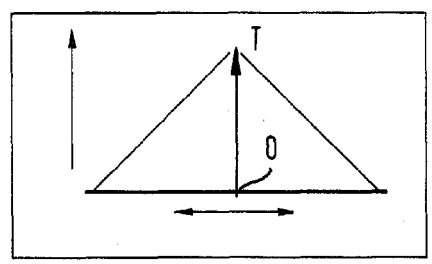

If the wall 1 of the sensor is not a fixed wall but a moveable membrane, the pressure inside the sensor can also be varied by applying a force. The change in pressure then results in a change in temperature which is detected by the temperature sensors built in the plate 4. From this it is then possible to calculate a force from which the mass either of the laundry unit or an imbalance can be deduced. Using the temperature sensors it is furthermore possible to deduce accelerations in the sensor plane and any change in angle, as already shown above with reference to levelling in connection with FIG. 2. Thus, the quantities weighing, levelling and imbalance monitoring can be determined using a sensor such as shown in FIG. 1*a*. The sensor is either attached to the soapy water container so that it serves for levelling and imbalance monitoring or it is arranged on the frame structure of the household appliance so that, in addition to weighing and monitoring imbalance, it can also be used for levelling the household appliance. In this way, the user is assisted in adjusting the household appliance when this is first set up in a position. Equally the customer is also assisted in loading the household appliance in that he is notified about the washing already inserted, for example, via a display or audibly. In the event of overloading, a warning signal is generated so that any damage to the household appliance caused by the mass of a laundry unit being too high is avoided. Tumbling imbalance, i.e., an imbalance along the drum motor axis of the washing machine or the washer drier can also be identified according to the invention so that measures to compensate for the tumbling imbalance can be introduced. In this case, the tumbling imbalance can be compensated by speed ramping using a suitably matched motor control system. If an imbalance has been identified, a regulating mechanism results in countercontrol, for example, by reversing the laundry unit.

Figure 5:
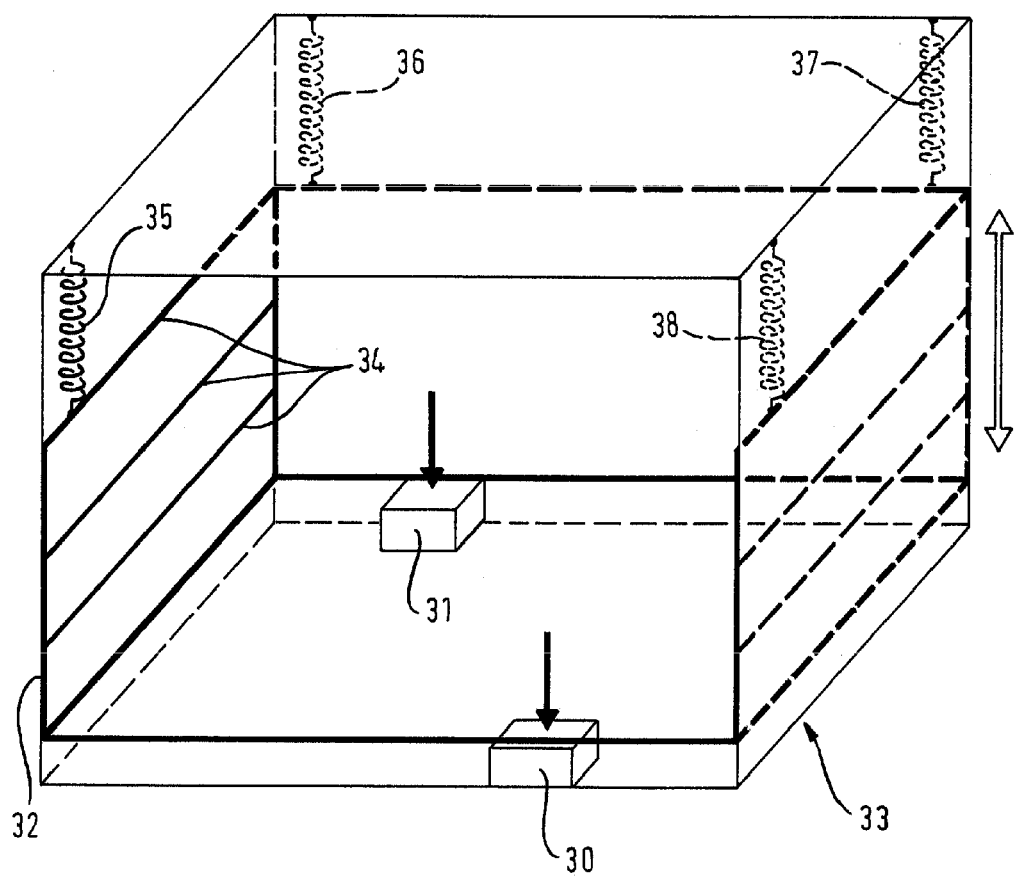
FIG. 5 is a baking oven with sensors according to the invention and FIG. 6 is a spray arm of a dishwasher with a sensor.

In another exemplary embodiment (FIG. 5), at least one acceleration sensor according to the invention, a sensor 30, preferably a second sensor 31, is provided, said sensor being affixed below a sheet-metal guide frame 32 of a baking oven 33. As described above, both sensors 30, 31 are based on measuring a temperature profile produced by a heating device built into each sensor 30, 31. The sheet-metal guide frame 32 receives baking sheets in guide strips 34. The sheet-metal guide frame 32 is suspended by means of springs 35 to 38 inside a frame of a baking oven 33. When the baking oven 33 is loaded, the springs 35 to 38 are deflected and the sheet-metal guide frame 32 is thus lowered. The sensors 30, 31 are thereby accelerated in the perpendicular direction. In an alternative embodiment the perpendicular movement of the sheet-metal guide frame 32 is converted into a horizontal movement in order to accelerate the sensors in the horizontal direction in this fashion. In this way the loading of the baking oven 33 with baking goods is measured.

The considerable lack of sensitivity to temperature of the sensors 30, 31 should be seen as a particular advantage of this weighing device. For the case that, as shown, at least two sensors 30, 31 are provided, which for example, viewed in the sliding direction of the baking sheets, have a certain spatial offset to one another, a spatial resolution of the weight loading of the baking sheet can also be determined. The air circulation during circulating-air operation in the baking oven 33 or the temperature guidance in the baking oven 33 can then be adapted accordingly. The sheet-metal guide frame is easily tiltable without jamming. It can be removed for cleaning. The sheet-metal guide frame 32 either consists of a wire framework or of a flat enamel frame.

Figure 6A:
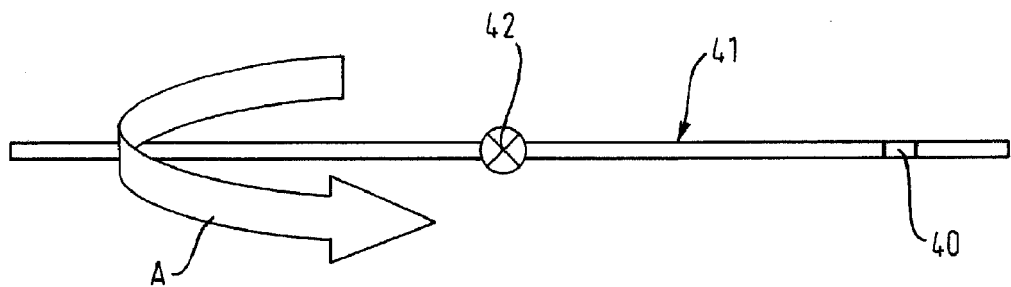
Figure 6B:
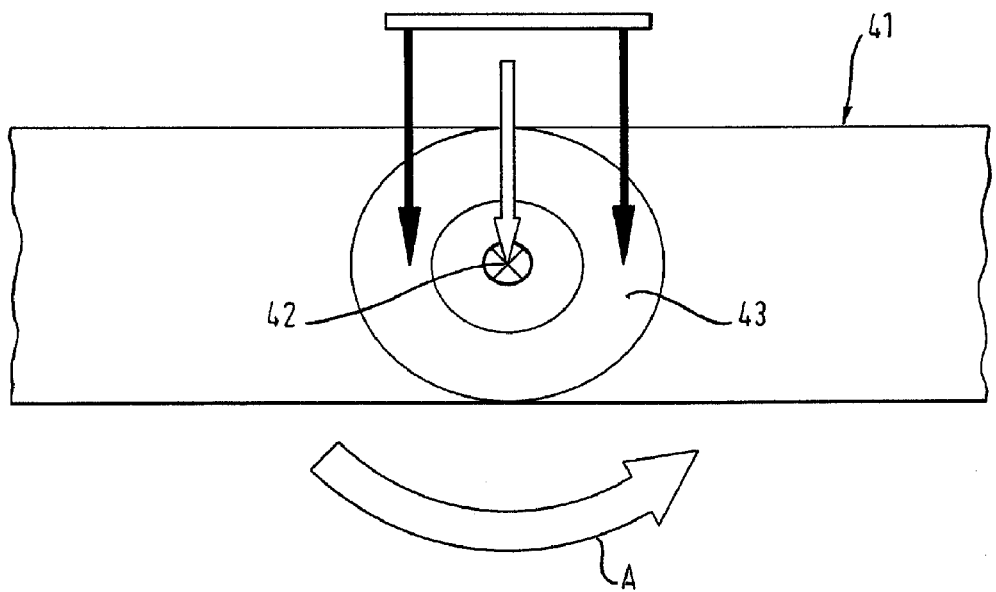

In another exemplary embodiment (FIG. 6*a, b*) a sensor 40 according to the invention is provided in a spray arm 41 of a dishwasher. The spray arm 41 is mounted on a pivot 42. It turns in the direction of the arrow A to spray washing solution onto the crockery. In this case, the sensor 40 experiences a radial acceleration from which the rotation speed and thus the number of revolutions, the spray arm position and also any stopping of the spray arm can be determined. The signal is transmitted either by radio, by pressure contact or via a sliding contact 43 which is arranged in the vicinity of the pivot 42 and produces an electrical connection with an electrical lead in the casing of the dishwasher.

An acceleration sensor is provided for a household appliance 20 which is used both for levelling the household appliance and also for weighing a material inserted in the household appliance, for example a laundry unit or crockery and in addition, especially for a linen treatment device, serves to monitor imbalances. The sensor is based on the fact that a temperature profile produced by a thermal source, for example, an immersion heater 5 inside a sealed chamber 6 containing a gas, undergoes a displacement as a result of the acceleration which is measured by means of temperature sensors arranged in a flat plate 4.

What is claimed is:

1. A linen treatment device, comprising:
a soapy water container; and
an arrangement for determining an imbalance of the soapy water container, the arrangement including:
a lever device coupled to the soapy water container; and
a sensor coupled to the lever device, wherein the sensor measures a temperature profile of a heating device built into the sensor,
wherein the temperature profile of the heating device is altered by acceleration resulting from the imbalance of the soapy water container such that the imbalance of the soapy water container is determinable by the sensor, and
wherein the sensor determines a direction and a magnitude of the imbalance of the soapy water container.

2. The linen treatment device according to claim 1, comprising:
a measuring device that determines a mass from a value measured by the sensor.

3. The linen treatment device according to claim 2, comprising:
a display device coupled to the measuring device that displays the mass of linen added to the device.

4. The linen treatment device according to claim 3, wherein the display device emits a warning signal when the mass measured exceeds a predetermined overload value.

5. The linen treatment device according to claim 1, wherein the imbalance is an imbalance along a rotational axis of the soapy water container.

6. The linen treatment device according to claim 1, wherein the imbalance is an imbalance with respect to a rotational axis of the soapy water container.

7. The linen treatment device according to claim 1, wherein the lever device converts the imbalance of the soapy water container to translational movement at the sensor.

8. The linen treatment device according to claim 1, wherein the sensor is on the lever device.

* * * * *